United States Patent
Youssefi (10) Patent No.: US 10,771,407 B2
(45) Date of Patent: Sep. 8, 2020

(54) MULTI-LEVEL BOT ARCHITECTURE FOR DATA ACCESS

(71) Applicant: PAYPAL, INC., San Jose, CA (US)

(72) Inventor: Amir Youssefi, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 284 days.

(21) Appl. No.: 15/859,166

(22) Filed: Dec. 29, 2017

(65) Prior Publication Data

US 2019/0207875 A1 Jul. 4, 2019

(51) Int. Cl.
*H04L 12/58* (2006.01)
*H04L 29/06* (2006.01)
*G06F 16/951* (2019.01)
*G06F 16/9032* (2019.01)

(52) U.S. Cl.
CPC ........ *H04L 51/02* (2013.01); *G06F 16/90332* (2019.01); *G06F 16/951* (2019.01); *H04L 51/04* (2013.01); *H04L 63/105* (2013.01)

(58) Field of Classification Search
CPC ....... H04L 51/02; H04L 51/04; H04L 63/105; G06F 16/90332; G06F 16/951
USPC ......................................................... 726/26
See application file for complete search history.

(56) References Cited

U.S. PATENT DOCUMENTS

| | | | | |
|---|---|---|---|---|
| 10,469,665 B1 * | 11/2019 | Bell | .................... | H04M 3/5191 |
| 10,528,874 B2 * | 1/2020 | Appel | ...................... | G06N 5/04 |
| 10,594,840 B1 * | 3/2020 | Darby | .................... | H04W 4/14 |
| 2003/0182391 A1 * | 9/2003 | Leber | .................... | G06F 16/951 |
| | | | | 709/217 |
| 2011/0078105 A1 * | 3/2011 | Wallace | ................. | G06Q 30/02 |
| | | | | 706/47 |
| 2012/0095835 A1 * | 4/2012 | Makar | .................... | G06Q 30/02 |
| | | | | 705/14.53 |
| 2014/0122407 A1 * | 5/2014 | Duan | ....................... | G06N 5/02 |
| | | | | 706/50 |
| 2014/0279050 A1 * | 9/2014 | Makar | .................... | G06N 20/00 |
| | | | | 705/14.66 |

(Continued)

OTHER PUBLICATIONS

Turan, Mustafa "Backend Design/Architecture Practices for Chatbots," Chatbots Magazine, May 29, 2017, 8 pages, [online] [Retrieved on Mar. 11, 2019] <URL: http://chatbotmagazine.com/backend-design-architecture-practices-for-chatbots-a40817ed5b70>.

*Primary Examiner* — Shahriar Zarrineh
(74) *Attorney, Agent, or Firm* — Haynes and Boone, LLP (57) ABSTRACT

A method for using multi-level bots is discussed. The method includes accessing, via an integration bot, a chat text, provided by a chat application instance, that indicates a user query. The method includes accessing a user state associated with a user of the chat application instance, the user state indicating previous chat texts associated with the chat application instance and corresponding knowledge queries. The method includes generating, based on the user state and analysis of the chat text, a knowledge query for data access using one or more domain bots. The method includes determining, based on the knowledge query, a domain bot and associated communication protocol. The method includes communicating the knowledge query using the communication protocol to the domain bot to obtain a reply. The method includes communicating a response text to the chat application instance, the response text generated based on the reply and the user state.

20 Claims, 6 Drawing Sheets

(56) References Cited

U.S. PATENT DOCUMENTS

| | | |
|---|---|---|
| 2014/0359027 A1* | 12/2014 | Pujare .................... H04L 69/08 |
| | | 709/206 |
| 2016/0094507 A1 | 3/2016 | Li et al. |
| 2016/0140236 A1 | 5/2016 | Estes |
| 2017/0048170 A1* | 2/2017 | Smullen ................ H04L 67/322 |
| 2017/0180284 A1 | 6/2017 | Smullen et al. |
| 2017/0364593 A1 | 12/2017 | Busey et al. |
| 2018/0026919 A1* | 1/2018 | Gau .................... G06F 16/9535 |
| | | 709/206 |
| 2018/0131643 A1* | 5/2018 | Trufinescu .............. H04L 51/02 |
| 2018/0212904 A1* | 7/2018 | Smullen ................. H04L 51/02 |
| 2018/0247648 A1* | 8/2018 | Nadimpalli ............. G10L 15/22 |
| 2018/0287968 A1* | 10/2018 | Koukoumidis ....... G06F 16/248 |
| 2019/0007228 A1* | 1/2019 | Vuskovic ............ H04L 12/1813 |
| 2019/0089655 A1* | 3/2019 | Uppala .................... H04L 67/16 |
| 2019/0104093 A1* | 4/2019 | Lim .................... G06F 11/0766 |
| 2019/0149489 A1* | 5/2019 | Akbulut .............. H04L 12/1822 |
| | | 709/206 |
| 2019/0171845 A1* | 6/2019 | Dotan-Cohen ......... H04L 51/04 |
| 2020/0036658 A1* | 1/2020 | Elango .................... H04L 51/04 |

\* cited by examiner

MULTI-LEVEL BOT ARCHITECTURE FOR DATA ACCESS

TECHNICAL FIELD

Embodiments of the present disclosure generally relate to the field of communication systems and, more particularly, to communication architecture between bot applications.

BACKGROUND

Chat sessions facilitate communication between chat applications in a communication system. A user of a chat application can communicate, over a communication network, with a user of another chat application by transmitting communication to, and receiving communication from, the chat session. A bot application can simulate a chat application to communicate with other chat applications using the chat session. Bot applications can perform various tasks such as data look-up, access user contacts, and access Software-as-a-Service (SaaS) functionality, among others. Furthermore, development of multiple bot applications is cumbersome and difficult, as development of each bot application may require separate conversational components. As a result, the development of new bot applications is expensive and time-consuming, which are barriers to having a healthy ecosystem of bot applications.

In addition, some users may find it frustrating when needing to use multiple chat applications as required to communicate with multiple bot applications. Integration among various bot applications also has issues, such as when requiring a user to use separate chat applications in order to access separate bot applications. As a result, some users may be discouraged from using multiple bot applications for accessing data and/or performing various tasks. Some of these users may be discouraged from communicating over chat sessions to access bot application functionality altogether.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present disclosure. However, it is understood that the described embodiments may be practiced without these specific details. For instance, although some examples refer to social media services, other types of media services are contemplated, such as online news services, other blogs, and/or other websites that can receive communication from users, and also facilitate displaying of content of such communication.

Chat sessions facilitate communication between instances of chat applications running on various devices in a communication system. A user of one instance of a chat application can communicate, over the communication system, with a user of another instance of a chat application by transmitting and receiving communication to/from the chat session. For example, the communication system facilitates the transmission of chat texts, over a communication network, between the instances of the chat applications and the chat session. The chat session, which can be hosted by a chat server, can facilitate communication between the multiple instances of the chat applications. Each chat application, such as a SLACK chat application, or a FACEBOOK MESSENGER application, can be hosted by a user device. In some cases, the communication may be between multiple instances of the same type of chat application. In other cases, the communication may involve instances of multiple different types of chat applications. The user device can be any type of a personal device such as a mobile phone, tablet, or other computing device. Thus, for example, multiple SLACK chat application instances can communicate with each other by transmitting chat texts to, and receiving chat texts from, a SLACK chat session.

An integration bot can communicate with a chat session and simulate a chat application instance for communicating with the other chat application instances. A user can interface with a bot application via a conversational interface that is provided via a chat session (which can be provided via a web interface). For example, a bot application may simulate a SLACK chat application instance for communicating, via a SLACK chat session, with other SLACK chat application instances. A bot application can send and receive chat texts from the chat session. A bot application can also access chat texts that are provided via web interfaces (also referred to as being provided via chat sessions), such as by accessing, via a browser, web pages provided by a service provider.

A domain bot can provides access to data and/or services. A domain bot can, for example, access online services such as web services. A domain bot can cause the online services to perform various transactions such as perform fund transfer between user accounts, use Software as a Service (SaaS), among others. A domain bot can access data at databases via Structured Query Language (SQL), Oracle database, and/or any relational or object-oriented database. A domain bot can monitor status of transactions being performed at local or external services, and/or status of various software applications. A domain bot can implement a subject matter expert for a certain knowledge area, and that can accesses data and/or services for that knowledge area.

In some embodiments, a domain bot can be accessed via a conversational interface, similar to that of a chat bot application. In some embodiments, a domain bot can be accessed using a command sequence that is generated based on communication parameters associated with that domain bot. In some embodiments, a domain bot can be accessed using semi-structured data, such as eXtensible Markup Language (XML) and JavaScript Object Notation (JSON). The integration bot can access the domain bots without providing confidential user information, such as by stripping certain information from user queries. The integration bot can augment the knowledge query by providing context information necessary for the domain bots to access appropriate data and/or services as indicated by a user query.

The domain bots can be created by developers without needing to be aware of user states and/or interfacing with the chat application instances. The development of new domain bots is made easier by implementing schemas for communication protocols between the integration bot and domain bots. The integration bot is configured for performing context determination, chat text analysis, and chat conversations via chat sessions. The new domain bot simply needs to use a communication protocol that conforms to a general communication protocol schema. Thus, the developer concentrates on developing the functionality of the new domain bot, while communication and context functionality is off-loaded to the integration bot.

In some embodiments, an integration bot can access a chat text that is provided by a chat application instance, where the chat text indicates a user query. The integration bot can access a user state associated with a user of the chat application instance, where the user state can indicate a context for the user query. The user state can also indicate previous chat texts associated with the chat application instance and corresponding knowledge queries. The integration bot can generate, based on the user state and analysis of the chat text, a knowledge query for data access using one or more domain loots. The integration bot can determine, based on the knowledge query, a domain bot and associated communication protocol. The integration bot can communicate the knowledge query using the communication protocol to the domain bot to obtain a reply. The integration bot can communicate a response text to the chat application instance, where the response text is generated based on the reply and the user state.

As a result, development of new domain bots is made easier for the developers. Furthermore, users can access functionality of multiple domain bots via one integration bot (and be unaware of existence of any domain bots). As the integration bot can provide different level of communication to chat application instances depending on their security level, yet another benefit is to provide network administration and security functionality by determining what type of data can be communicated outside of the local entity network, which can be required for information security and privacy purposes. The following description, and associated Figures, illustrates various embodiments directed to the ideas listed above.

Figure 1:
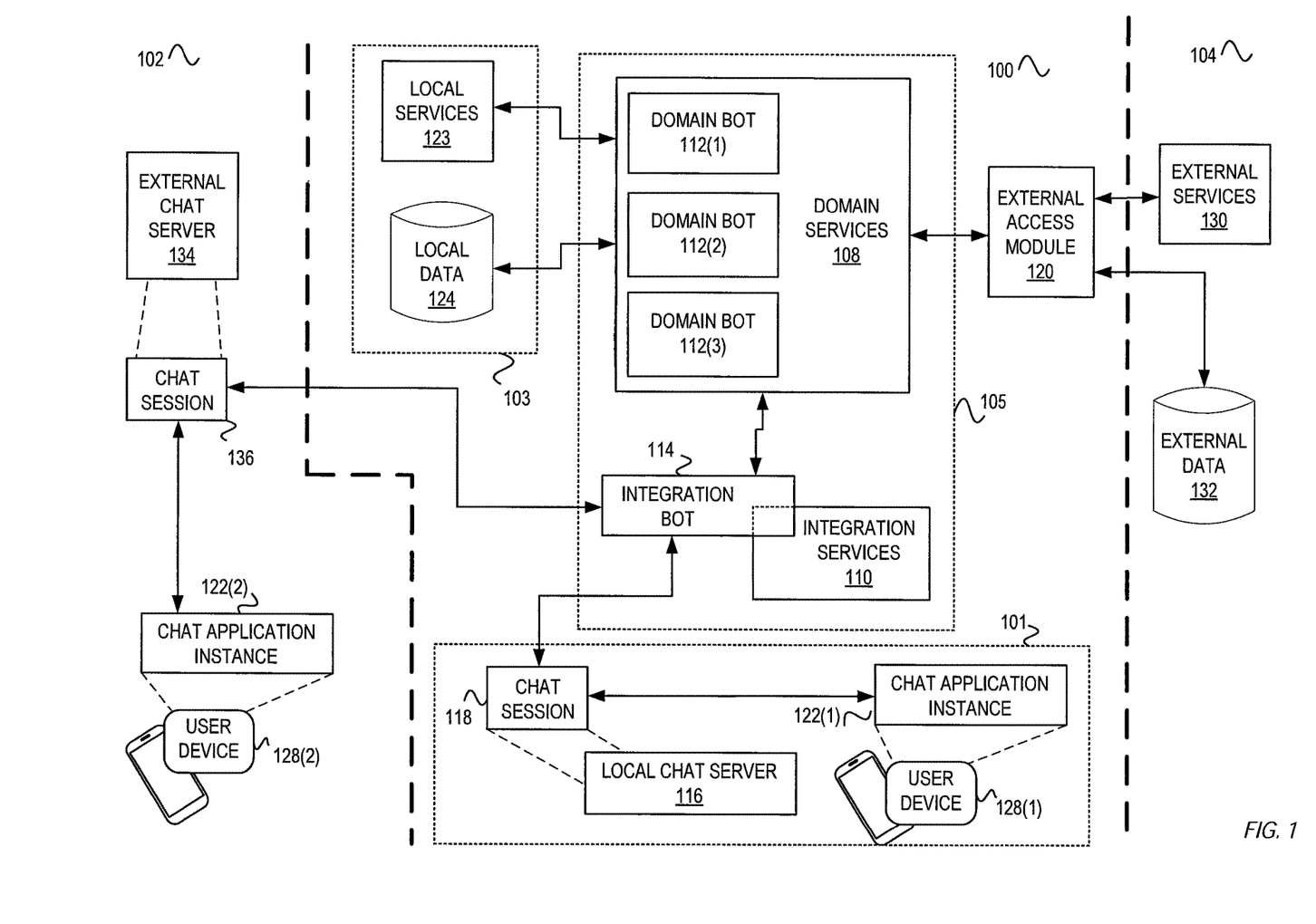
FIG. 1 is a system diagram illustrating embodiments of a communication system that uses an integration bot and multiple domain bots for data access at a knowledge system.

FIG. 1 is a system diagram illustrating embodiments of a communication system that uses an integration bot application and multiple domain bots for data access at a knowledge system. In an overview of the system diagram of FIG. 1, a knowledge system 105 can be accessed by local applications 101 and/or external applications 102. The knowledge system 105 can access local sources 103 (that includes local services 123 and local data 124) and/or external sources 104 (that includes external services 130 and external data 132). The knowledge system 105 can be accessed using chat texts that can be provided via chat application instances 122(1) and 122(2) to perform various tasks and/or transactions, perform data searches, access online services, among others. The local sources 103, the knowledge system 105, the local applications 101, and an external access module 120 can be referred to as local entities 100, as they are implemented inside a trusted network, such as a secure intranet. The external access module 120 can facilitate communication between the domain services 108 and the external sources 104. The external applications 102 and the external sources 104, which can be referred to collectively as external entities, are implemented outside of the trusted network, and thus may be considered not secure.

In some embodiments, an integration bot 114 can be hosted by integration services 110. The integration bot 114 can communicate with a chat session 136. The external chat server 134 and the local chat server 116 can be of the same type, e.g., can both be SLACK servers. Thus, both the chat sessions 136 and the chat session 118 can be SLACK chat sessions, and the chat application instances 122(1) and 122(2) can be SLACK chat application instances. However, in other cases, a service or an application (such as the integration bot 114) can be hosted by a combination of software and hardware. It is noted that the same term "hosting" is used herein to describe both software hosting and hardware hosting. It is noted that access to the chat session 136 can be implemented at via web browser interfaces, in which case the external chat server 134 may not be used. When access to the chat session 136 is implemented via web browser interfaces, the chat application instance 122(2) can simply be a part of a web browser interface displayed at the user device 128(2).

The integration bot 114 can determine a security level of each chat application instance for communication. The integration bot 114 can provide different level of communication to chat application instances depending on their security level. For example, the integration bot 114 can provide limited communication to the chat session 136 based on a non-trusted and thus lower security level of the external chat server 134 that hosts the chat session 136. Similarly, the integration bot 114 can provide more complete communication to the chat session 118 based on a trusted and thus higher security level of the local chat server 116 that hosts the chat session 118. The integration bot 114 can provide limited communication by limiting an amount of information communicated to certain chat application instances and/or by only using certain communication commands (e.g., of a communication sequence). For example, the integration bot 114 can omit a subset of information from being communicated to the chat application instance 122(2) based on a low security level of the external applications 102.

The integration bot 114 can determine a security level of each source for obtaining data and/or services. In some embodiments, the integration bot 114 can cause the domain services to provide limited communication when communicating with the external sources 104. The integration bot 114 can use a different level of communication to obtain data from the sources depending on their security level. For example, the integration bot 114 can direct the domain services 108 to provide limited communication to the external sources 104 based on a non-trusted and thus lower security level of the external services 130 and/or the external data 132. Similarly, the integration bot 114 provides more complete communication to the chat session 118 based on a trusted and thus higher security level of the local chat server 116 that hosts the chat session 118. The integration bot 114 can provide limited communication by limiting an amount of information communicated to external sources and/or by only using certain communication commands.

In some embodiments, the integration bot 114 can cause the domain services 108 to use certain routing paths when accessing data sources. For example, the integration bot 114 can cause (e.g., by providing routing communication commands) the domain services 108 to use a domain bot 112(2)

to access a certain one of external services 130) to obtain a result. The integration bot 114 can also cause (e.g., by providing routing communication commands) the domain services 108 to use the same domain bot 112(2) to access the local data 124 to obtain another result. The integration bot 114 can then combine the results, accounting for security level when communicating with chat application instances.

The chat session 136 is hosted by an external chat server 134. Chat application instances 122(2) and 122(2) (e.g., instances of the same type of chat application, instances of more than one type of chat application) can communicate with other chat application instances via the chat sessions 136 and 118, respectively. The integration bot 114 can simulate a chat application instance when communicating with the chat application instance 122(1) and 122(2). Each of the chat application instances 122(1) and 122(2) may be hosted by a respective user device 128(1) and 128(2).

Each of the domain bots 112(1)-112(3) can provides access to different data and/or services. The domain bot 112(1) can, for example, access local sources 103, whereas the domain bot 112(2) can access external sources 104. Each of the domain bots 112(1)-112(3) can be on-boarded for use with the integration services 110. During the onboarding process, the integration services 110 can configure the domain bot, such as to cause the domain bot to perform certain transactions, to read data obtained by the domain bot, and/or to cause the domain bot to write certain data at a certain location. During the onboarding process, the integration services 110 can determine which of the local sources 103 and/or external sources 104 are used by the particular domain bot. The onboarding process thus can determine the communication protocol associated with the domain bot, determine a security level associated with the domain bot, and/or determine one or more sources of data and/or service for the domain bot. The integration services 110 can provide communication protocol and other identifying information for the on-boarded domain bot(s) to the integration bot 114.

As noted in this disclosure, each of the domain bots 112(1)-112(3) operates without accessing user state of a user of the chat application instance 122(1) or 122(2). Instead, the integration bot 114 maintains and accesses user state information for each user that communicates with the integration bot 114. The integration bot 114 then communicates with certain ones of the domain bots 112(1)-112(3). Thus, the integration bot 114 can abstract user state, such as user information, from communication with the domain bots 112(1)-112(3).

In some embodiments, a domain bot can be accessed via a conversational interface, similar to that of a chat bot application. In some embodiments, a domain bot can be accessed using a command sequence that is generated based on communication parameters associated with that domain bot. In some embodiments, a domain bot can be accessed using semi-structured data, such as eXtensible Markup Language (XML) and JavaScript Object Notation (JSON).

Each of the domain bots 112(1)-112(3) can provide a different service. For example, the domain bot 112(3) can interface with a payment system (not shown) to provide instructions to the payment system and receive financial information regarding users. The payment system can provide financial services, such as a fund transfer (e.g., a transfer of a certain monetary amount), to users, such as a user of the chat application instance 122(1) or 122(2). The payment system can include payment accounts, each of which can be associated with a user. For example, one user (e.g., a user of the chat application instance 122(1)) can be associated with a first payment account, and another user (e.g., a user of the chat application instance 122(2)) can be associated with a second payment account at the payment system. The payment system can facilitate a fund transfer from the first payment account to the second payment account. The payment system can receive instructions, via the domain bot 112(3) as caused by the integration bot 114, to transfer funds from the first payment account to the second payment account.

In some embodiments, the integration services 110 and the integration bot 114 can be implemented by the same software entity. In other embodiments, the integration services 110 can host the integration bot 114, and provide services to chat application instances. In one embodiment, the integration bot 114 provides communication capabilities with the chat application instances 122(1) and 122(2) as well as with the domain bots 112(1)-112(3), whereas the integration services can perform the onboarding process of each domain bot with the integration bot 114. The integration services 110 can also store onboarding and user account data (e.g., via the user state) that is accessible by the integration bot 114.

The knowledge system 105 can include the domain services 108 and the integration services 110. The domain services 108 include the domain bots 112(1)-112(3) which are bots that are on-boarded with the integration services 110. Each domain bot can simply be accessible via a certain communication protocol which provided to the integration services 110. The domain services 108 can provide a routing layer between each of the domain bots 112(1)-112(3) and the integration bot 114, the local sources 103, and/or the external sources 104.

The integration bot 114 can perform natural language processing (NLP) on chat texts provided by the chat application instance 122(1) or 122(2). Based on the NLP, the integration bot 114 can determine whether the user has provided a user query for the knowledge system 105. The integration bot 114 can also perform other analysis, such as search for certain text strings that indicate a user query, including "search," "look for," "what is" and others. The integration bot 114 can search for certain text strings that indicate intent to perform an action, including "please use," "perform," "want," "need," and others. In some embodiments, the integration bot 114 may utilize various customized dictionaries for the NLP based on the user, user device, chat application, etc. In some embodiments, different customized dictionaries, or different customizations of a particular dictionary, may be utilized for the same user (e.g., based on the chat application, user device, or other factor). Accordingly, the NLP performance may be optimized based on various factors. Example chat texts are described below with reference to FIG. 3.

The integration bot 114 can access user states associated with respective users of the chat application instances 122(1) and/or 122(2). The user state can indicate context for the user query. The user state can indicate previous chat texts associated with the chat application instance and corresponding knowledge queries. The user state can store any information that is stripped off from the user query, i.e., not used by the knowledge query that is communicated to the domain bot(s). Information that can be stripped off includes elements of the user query that have confidential, sensitive, and/or not relevant information. The user state can also indicate user accounts, user location, and other identifying information that can be augmented into the knowledge query and used by the domain bot(s). The user state can indicate tokens that are used to indicate authentication and/or authorization of the user to access certain data and/or transactions. The user state can be associated with users of the chat application instances 122(1) and 122(2).

In some embodiments, the user state can also include an embedded page indicator, which in applicable situations indicates a location in a customer flow at the chat application instance. For cases where the chat application instance is implemented at the user's web browser, the embedded page indicator can indicate a particular web page from which the chat text is provided to the chat session 136. The embedded page indicator can, for example, indicate that the chat text originated at a certain transaction web page, at an FAQ page, or at a complaints page. For cases where the chat application instance is implemented as a SLACK or another social messaging service, the embedded page can indicate a location in the customer flow (e.g., as used by the integration bot 114).

The integration bot 114 can generate, based on the user state and analysis of the chat text, a knowledge query for data access at the domain services 108. Example knowledge query is described below with reference to FIG. 4. The integration bot 114 can select, based on the knowledge query, one or more of the domain bots 112(1)-112(3) for access with the knowledge query (or with multiple knowledge queries). The integration bot 114 can also determine an associated communication protocol for the selected domain bot(s). The integration bot 114 can communicate the knowledge query using the communication protocol to the domain bot, such as the domain bot 112(1) to obtain a reply. The integration bot 114 can generate the response text based on the reply and the user state.

Figure 2:
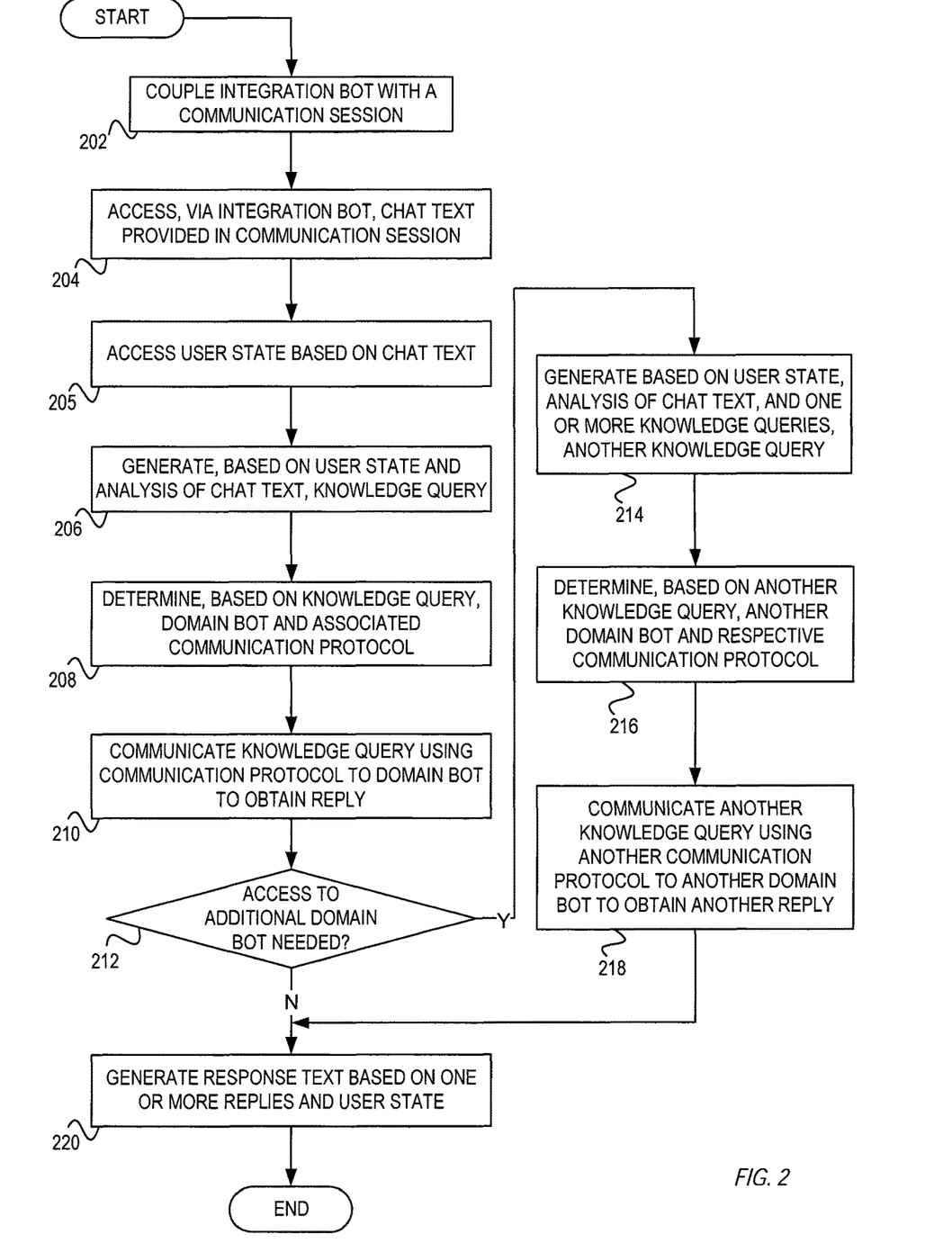
FIG. 2 is a flow diagram illustrating embodiments of operations for using the integration bot to access multiple domain bots for data access at a knowledge system.

FIG. 2 is a flow diagram illustrating embodiments of operations for accessing chat sessions for cart generation. The method of FIG. 2 is described with reference to the systems and components described in FIG. 1 (for illustration purposes and not as a limitation). The example operations can be carried out by the integration bot 114. As noted, the operations can be carried out in different order than that is shown, and some operations can be omitted or combined. For example, the operations 214-218 can be combined with operations 206-220. In another example, the operations 208 and 210 can be performed substantially in parallel.

Beginning with 202, an integration bot is coupled with a chat session. With reference to FIG. 1, the integration bot 114 can be coupled with the chat session 136 and/or the chat session 118. Coupling of the integration bot with a chat session can include registering with a chat session and configuring the chat bot for communication using the chat session. As noted above, the chat session can be provided and accessed by the user via chat application instances (which include access via web browser interfaces), and/or other implementations.

At 204, the integration bot accesses a chat text provided in the chat session. With reference to FIG. 1, the integration bot 114 can access a chat text provided in the chat session 136. The integration bot 114 can analyze the chat text(s) to determine identity of the user, as well as potential user query elements. At 205, the integration bot accesses a user state based on the chat text. With reference to FIG. 1, the integration bot 114 can access the user state associated with the user of the chat application instance 122(2).

At 206, the integration bot 114 generates, based on the user state and analysis of the chat text, a knowledge query. The knowledge query can be for accessing data at the knowledge system 105. The integration bot 114 can determine a type of the domain bot, such as based on type of data accessed by the domain bot including confidentiality of the data, whether the data is local (e.g., local data 124) or external (e.g., external data 132). The integration bot 114 can determine a security level of the chat application instance 122(2) based on whether access to communication on the external chat server 134 is secure, on whether the chat application instance 122(2) is accessed at a secure location, among various security concerns. The security level can indicate a level of data allowable to be communicated to the external chat server based on a type of data and/or information security policies at the knowledge system 105 and/or associated with the local entities 100 (e.g., by a network administrator for the local entities 100).

As discussed below with reference to FIG. 4, the integration bot 114 can strip-off one or more portions from the chat text based on the type of the domain bot and/or the security level. For example, the integration bot 114 can disregard and/or store (in the user state for the user) certain elements of the user query that have confidential and/or sensitive elements that are not communicated to a domain bot with a low security level. The integration bot 114 can disregard and/or store (in the user state) certain elements of the user query that are not relevant to the knowledge query being provided to the certain domain bot.

In some embodiments, the integration bot 114 can determine context of the user query based on the user state. The integration bot 114 can add elements to the user query based on the context when generating the knowledge query. For example, the integration bot 114 can add elements of the user's location if the user query only indicates a question of "what is the temperature." The integration bot 114 can augment the knowledge query using other elements based on the context such as account numbers, as noted above. The user state can also be used to access previous chat texts from the chat application instance 122(2) and corresponding knowledge queries to various ones of the domain bots 112(1)-112(3). This chat text history can be used to determine user state based on knowledge queries to different domain bots from the one being used.

At 208, the integration bot can determine, based on the knowledge query, the domain bot and associated communication protocol. The integration bot 114 can determine to access the domain bot 112(1) based on the analysis of the chat text and the user state, and/or the knowledge query. As noted above, the operations 206 and 208 can be performed substantially in parallel.

At 210, the integration bot communicates the knowledge query using the communication protocol to the domain bot to obtain a reply. The knowledge query can be translated, by the integration bot 114, into the communication protocol prior to communicating. The communication protocol can indicate a type and/or format of data that is communicated between the integration bot 114 and the domain bot 112(1). For example, the communication protocol can indicate how to communicate data using a certain schema that uses JavaScript Object Notation (JSON) (or an another semi-structured data schema, such as one that uses eXtensible Markup Language (XML)).

In some embodiments, the integration bot 114 can also determine a routing path that indicates a data or service source for the domain bot. The integration bot 114 can then use the routing path when communicating the knowledge query to the domain bot 112(1). The routing path can be determined based on the security level (of the chat application instance 122(2) that provided the chat text and/or of the selected domain bot 112(1)) and the knowledge query. The routing path can indicate how the domain bot 112(1) is to access the selected data source or service (e.g., the external data 132). In cases where there are multiple knowledge queries used (e.g., as discussed below with reference to operations 214-218), the routing path can indicate to the domain services 108 a sequence of how the domain bots 112(1)-112(3) are to be used to access data sources and/or services.

At 212, the integration bot determines whether access to an additional domain bot is needed. For example, the integration bot 114 can determine whether another knowledge query is needed to properly (e.g., as relevant to each element of the user query that is determined to be addressable based on the security level and other elements) address the based on analysis of the chat text, the user state, and the knowledge query. If the integration bot 114 determines that access to an additional domain bot is needed, the flow continues at 214, otherwise the flow continues at 220. In some embodiments, at 214-218, multiple additional knowledge queries can be generated and communicated to multiple domain bots.

At 214, the integration bot generates, based on the user state, the analysis of the one of more knowledge queries, and analysis of the chat text, another knowledge query. The operation at 214 can be performed by the integration bot 114 in a similar manner to that of operation 206, with the additional consideration of previously generated knowledge query (e.g., generated at 206) for the same user query. At 216, the integration bot 114 determines, based on the another knowledge query, another domain bot and respective communication protocol. The operation at 216 can be performed by the integration bot 114 in a similar manner to that of operation 208, with the additional consideration of previously generated knowledge query for the same user query. At 218, the integration bot 114 communicates the another knowledge query using the another communication protocol to the another domain bot to obtain another reply.

At 220, the integration bot generates a response text based on one or more replies and the user state. The integration bot 114 can generate the response text that is provided to the chat session 136 for access by the chat application instance 122(2). The replies can be augmented based on the context and/or extra information from the user state (e.g., any information that was stripped-off at 206). For example, certain elements of the user query that have confidential, sensitive, and/or not relevant that were not communicated to the selected domain bot can be used to augment the response text to provide additional context to the user. In cases where multiple knowledge queries were used, the integration bot 114 can combine information from respective replies into the response text.

Figure 3:
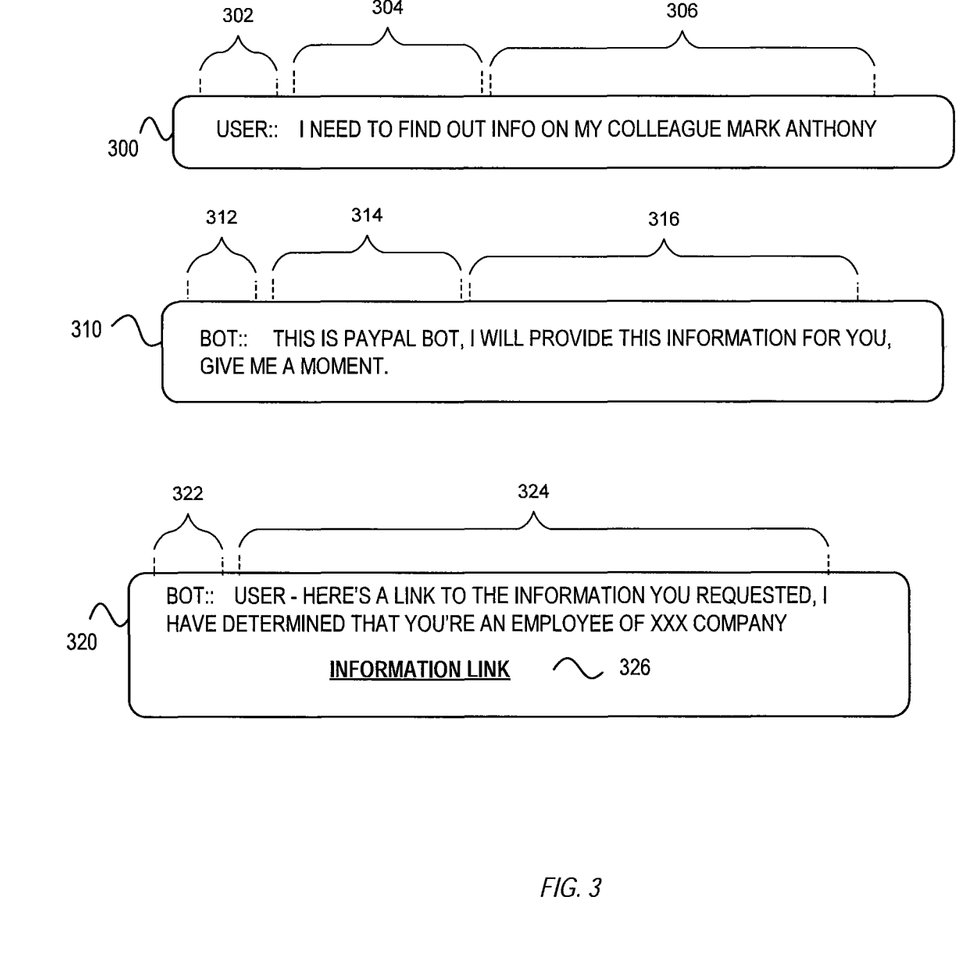
FIG. 3 illustrates embodiments of communication for accessing integration bot at the knowledge system.

FIG. 3 illustrates embodiments of communication for accessing integration bot at the knowledge system. Chat text 300 illustrates a chat text that can be provided, by the chat application instance 122(2), to the chat session 136. Chat texts 310 and 320 illustrate chat texts that can be transmitted by the integration bot 114 to the chat session 136.

The chat text 300 can include chat text portions (also referred to as "portions") 302-306. The integration bot 114 can access the chat text 300 and analyze the various portions 302-306, such as to determine a corresponding user query. In the depicted example embodiments, the portion 302 of "user1:" indicates that the chat application instance 122(2) is transmitting the chat text 300. The portion 304 of "I need to find out" can indicate (e.g., as analyzed and determined by the integration bot 114) intent by the user to pose a user query. The portion 306 of "info on my colleague Mark Anthony" can indicate the user query.

The chat text 310 can include portions 312, 314, and 316. The portion 312 of "bot:" indicates that the integration bot 114 is transmitting the chat text 310 to the chat session 136. The portion 314 indicates to the user that the integration bot 114 is transmitting the chat text 310. The portion 316 indicates to the user to wait a certain amount of time for the response text. It is noted that in other examples, the response text can be provided to the user in real-time, without any noticeable wait. The chat text 320 can include portions 322, 324, and 326. The portion 322 of "bot:" indicates that the integration bot 114 is transmitting the chat text 320 to the chat session 136. The chat text of 324 indicates to the user the response text that includes an information link 326. The information link 326 can point to a result, and can provide secure access to confidential information that is stored at the knowledge system 105.

Figure 4:
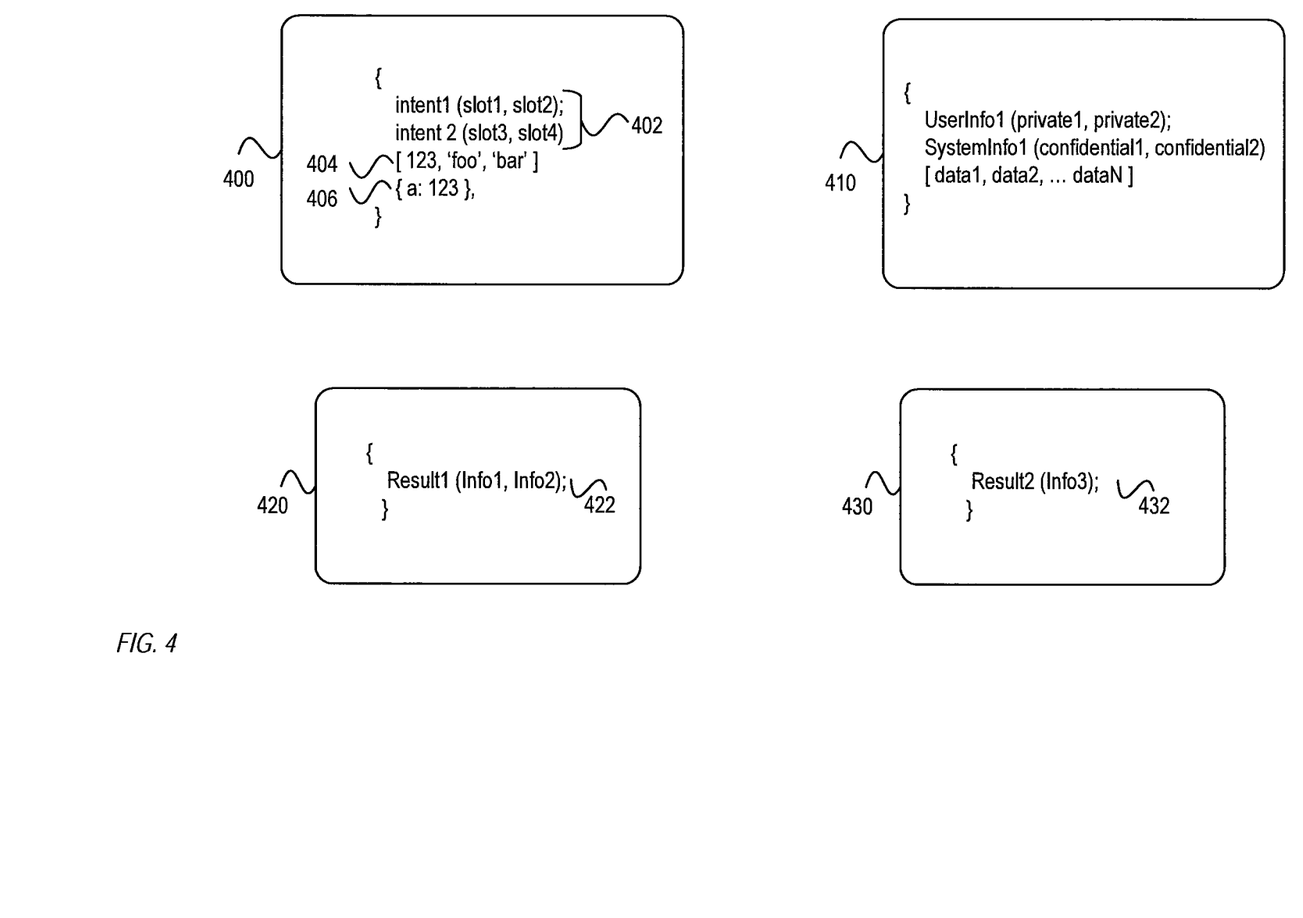
FIG. 4 illustrates embodiments of knowledge queries generated using respective communication protocols, an embodiment of a user state, and an embodiment of a result.

FIG. 4 illustrates embodiments of knowledge queries generated using respective communication protocols, an embodiment of a user state, and an embodiment of a result. For example, a knowledge query 400 can be generated by the integration bot 114 based on a certain user query received via a chat text. The integration bot 114 can also strip off certain elements of the user query and store them in a user state 410. The integration bot 114 can communicate the knowledge query 400 to a the domain bot 112(1), and also generate and communicate another knowledge query (not shown) to the domain bot 112(2).

Element 400 illustrates an embodiment of a knowledge query 400 that is generated for accessing the domain bot 112(1) based on a certain communication protocol. The knowledge query 400 can include intent and slot portion 402 that indicate a certain JSON-based implementation of how requests are communicated from the integration bot 114 to the domain bots. As shown, the intents (i.e., intent1 and intent2) indicate actions that correspond to elements of the user query. The slots (i.e., slot1-slot4) indicate arguments for their respective intents. In some implementations, element 404 is a data store that indicates data for use by the domain bot 112(1) during communication with the external or local sources. Element 406 is a sequence store that indicates a sequence of elements used by the domain bot 112(1).

In some embodiments, a user state can include a processed user query, from which the knowledge query is then generated. The processed user query can include augmented user query as determined based on the user state (e.g., using the context and/or previous user queries and/or chat texts). The processed user query can include any elements that are later stripped-off (when generating the knowledge query 400) due to confidential and/or non-relevant nature of this data. Using the example elements listed below, the stripped-off elements (i.e., for the knowledge query) can include Chat SessionID, Chat application type, certain data communicated via the user query, UserID, among others. The processed user query can include the following elements:

1) Intent, which can include actions such as GetLastPayment, EmployeeLookup, MakeAnAppointment, GetWeather, among others.

2) Detected slots and slot types, which can be different for each intent.

3) Chat application type, which can indicate whether the chat application instance 122(2) is used at a mobile user device, whether it is embedded in a SLACK or a web browser, among others.

4) EmbeddedPage, which can be implemented as an embedded page indicator, which can indicate a location in a customer flow at the chat application instance.

5) Chat SessionId, which can indicate a session ID of the chat session 136.

6) Context, which can indicate a context of the current and last few conversations with the user, including e.g. values of dates and location of each conversation over other chat sessions.

7) Authenticated UserID, User First Name, and/or User Last Name, which can indicate a user reference number and identifying information.

8) User Timezone and current time, which can indicate the timezone and time at which the chat text is provided to the chat session.

For example, for a user query of "what's temperature here," the integration bot can generate the following processed user query, from which the knowledge query is generated as discussed above.

---

Processed User Query

```
{
"Chat": "What's temperature there?",
"Intent": "Weather",
"Location": "",
"StartDate": "",
"EndDate": "",
"Chat Application Type": "SLACK",
"EmbeddedPage": "EventsPage",
"Chat SessionId": "12345ABCDE",
"LastChat": "{\"Chat\": \"I like this event.\",
\"Intent\": \"Event\",\"Location\": \" San
Francisco\",\"StartDate\": \"2016-10-01\",
\"EndDate\": \"2016-10-02\", \"Chat
Application Type\", \"SLACK\",\"Embedded
Page\": \"EventsPage,\"Chat SessionId\":
\"12345ABCDE\",\"PastLocation\": \"San
Francisco\"}",
"Username": "JohanDoeUser",
"FirstName": "John",
"LastName": "Doe",
"Timezone": "UTC"
}
```

---

The domain bot can generate a data query based on the knowledge query for the local data 124. For example, the data query can include the intent and slot portion 402. As discussed above, development of the domain bots is made easier by implementing a standard communication protocol between the integration bot and the domain bots, as well as by off-loading context determination, chat text analysis, and chat conversational techniques to the integration bot. Thus, the developer of a new domain bot simply conforms the new domain bot to a general schema for communication protocol such that the new domain bot can be on-boarded for use with the integration bot.

The user state 410 can be accessed and/or stored, for a certain user, by the integration bot 114, and can be generated based on multiple user queries from that user. The integration bot 114 can store a separate instance of the user state 410 for each user, where each separate instance would store information pertinent to that user. The user state 410 can include various user information (e.g., UserInfo1 . . . ) that indicates private and/or confidential information about the user. The user state 410 can also store system information (e.g., SystemInfo1 . . . ) that indicates information about the user devices used by the user. The user state 410 can also store additional data (e.g. data1 . . . ), such as a history of previous user queries, corresponding knowledge queries, domain bots that were accessed, respective replies, and/or response texts to the user queries.

Results 420 and 430 illustrate sample responses received from two separate domain bots in response to two separate knowledge queries for a single user query. As shown, the result 420 (as received from a first domain bot) can include two separate info elements 422, whereas the result 430 (as received from a second domain bot) can include a single info element 432. The integration bot 114 can then generate a single response text using the results 420 and 430, as well as the user state 410.

Figure 5:
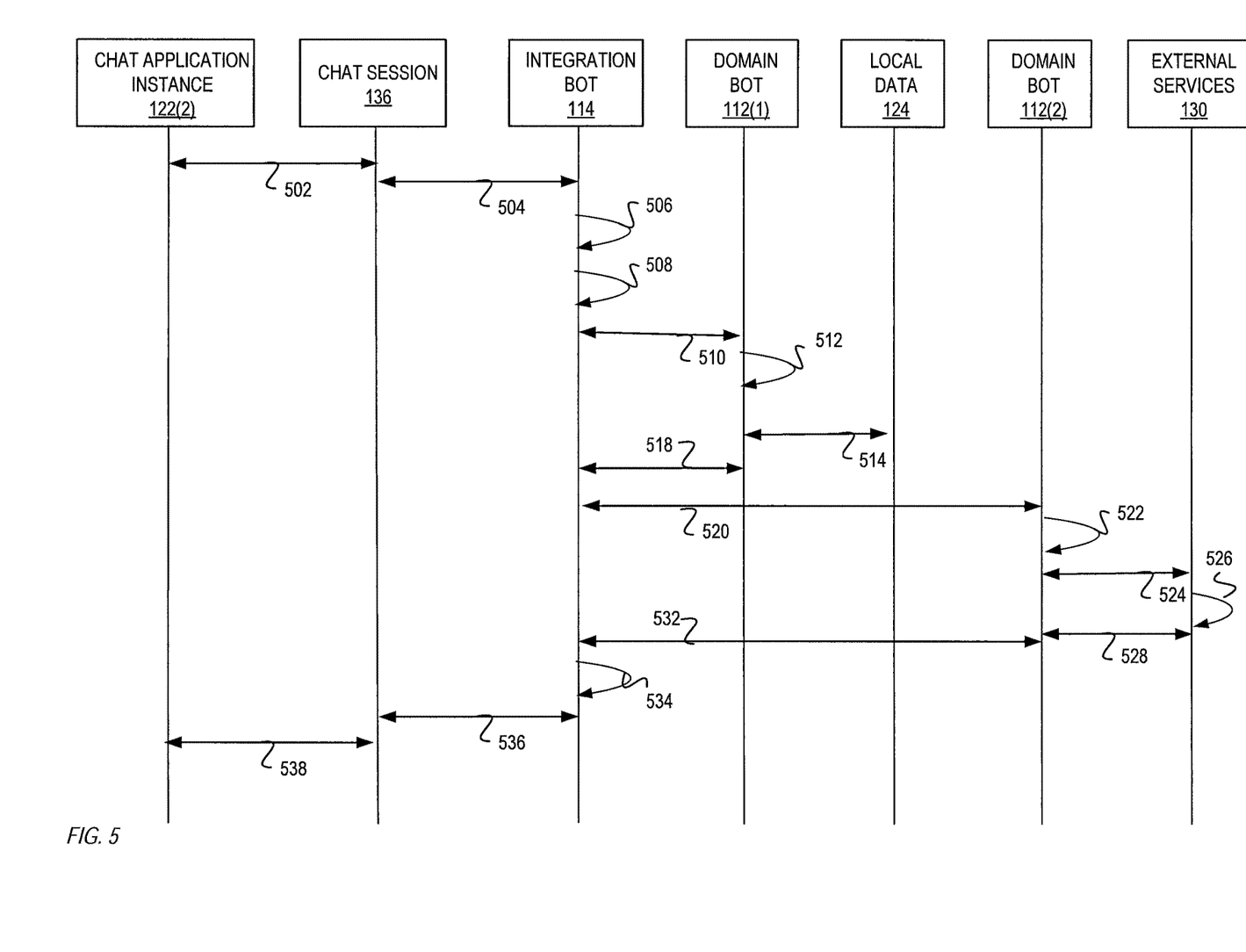
FIG. 5 is a timing diagram illustrating embodiments of communication between an integration bot, domain bots, and chat application instances.

FIG. 5 is a timing diagram illustrating embodiments of communication between an integration bot, domain bots, and chat application instances. As shown by FIG. 5, the integration bot 114 communicates via a chat session 136 with the chat application instance 122(2). The integration bot 114 also communicates with the domain bots 112(1) and 112(2). The domain bots 112(1) and 112(2) also communicate with the local data 124 and external services 130, respectively. The communications of FIG. 5 can be performed over one or more communication networks. Portions of the timing diagram of FIG. 5 correspond to the flow diagram of FIG. 2.

At 502, the chat application instance 122(2) provides a chat text to the chat session 136. At 504, the integration bot 114 accesses the chat text at the chat session 136. At 506, the integration bot 114 can access a user state associated with a user of the chat application instance 122(2). At 508, the integration bot 114 generates one or more knowledge queries for accessing data and services at the knowledge system. For example, the integration bot 114 can generate a first knowledge query for accessing data at the domain bot 112(1), and a second knowledge query for accessing services at the domain bot 112(2). At 510, the integration bot 114 accesses the domain bot 112(1) with the first knowledge query. At 512, the domain bot 112(1) can process the knowledge query and generate own data query for accessing the local data 124. At 514, the domain bot 112(1) accesses the local data 124 using the data query, including receiving data results from the local data 124. At 518, the domain bot 112(1) returns results to the integration bot 114.

At 520, the integration bot 114 accesses the domain bot 112(2) with the second knowledge query, which can be further modified by the integration bot based on the results from the domain bot 112(1). At 522, the domain bot 112(2) can process the second knowledge query and generate own service query (based on the second knowledge query) for accessing the external services 130. At 524, the domain bot 112(2) accesses the external services 130 using the service query. At 526, the external services 130 performs the service as requested by the service query, and at 528, the external services 130 transmits results to the domain bot 112(2). At 532, domain bot 112(2) returns results to the integration bot 114. At 534, the integration bot generates the response text based on the two separate results and also the user state. The response text is communicated by the integration bot 114 at 536 to the chat session 126, where it can be accessed, at 528, by the chat application instance 122(2).

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 2 and 5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
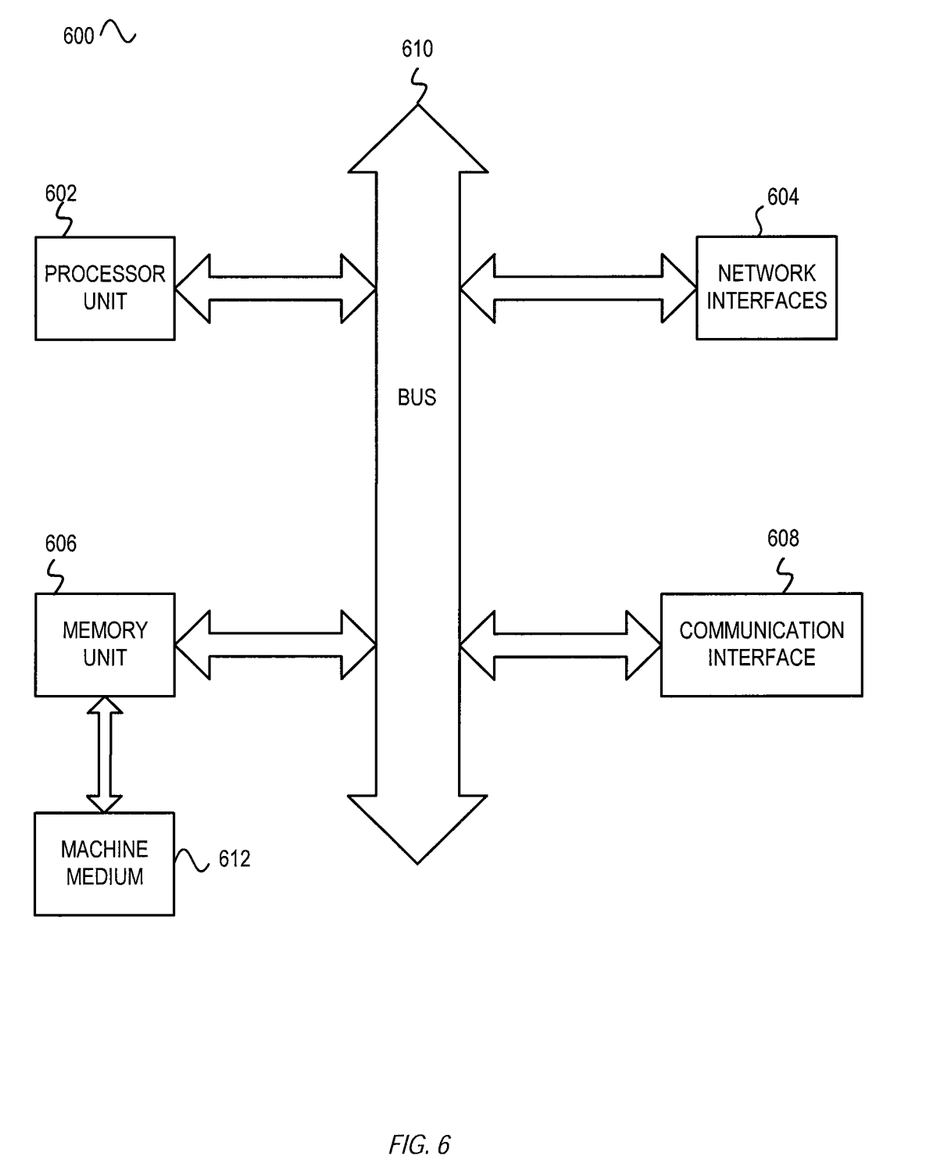
FIG. 6 is a block diagram of one embodiment of an electronic device used in the communication systems of FIGS. 1-5.

FIG. 6 is a block diagram of an exemplary embodiment of an electronic device 600 including a communication interface 608 for network communications. The electronic device can embody functionality to implement embodiments described in FIGS. 1-5 above. In some implementations, the electronic device 600 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.).

The electronic device 600 can also include a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include the bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that facilitate using an integration bot application and multiple domain bots for data access at a knowledge system. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interface 604 and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for using the integration bot as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for using multi-level bots comprising an integration bot and a plurality of domain bots, the method comprising:
accessing, via the integration bot, a chat text provided by a chat application instance, the chat text indicating a user query to a knowledge system, wherein the chat application instance is on a user device remote from the multi-level bots;
accessing, via the integration bot, a user state associated with a user of the chat application instance, the user state indicating previous chat texts associated with the chat application instance and corresponding knowledge queries;
generating, via the integration bot and based on the user state and analysis of the chat text, a knowledge query for the integration bot to access data at the knowledge system that comprises the plurality of domain bots;
determining, via the integration bot and based on the knowledge query, a domain bot from the plurality of domain bots to which the knowledge query will be directed and a communication protocol associated with the domain bot;
determining, via the integration bot, a security level associated with the domain bot;
removing, via the integration bot, text elements from the knowledge query based on the security level of the domain bot;
communicating, from the integration bot to the domain bot, the knowledge query using the communication protocol to obtain a reply from the domain bot;
generating, via the integration bot, a response text for the chat application instance based on the reply from the domain bot and the user state, wherein the response text includes at least one text element that was removed from the knowledge query based on the security level of the domain bot; and
communicating, via the integration bot, the response text to the chat application instance remote from the multi-level bots.

2. The method of claim 1, wherein
the accessing the chat text and the communicating the response text is performed via a chat session that is hosted by an external chat server;
the security level of the chat application instance indicates a level of data allowable to be communicated to the external chat server; and
the generating the knowledge query is further based on the security level.

3. The method of claim 1, further comprising:
determining communication parameters of the domain bot, including translating one or more user query elements into communication parameters, wherein said communicating the knowledge query uses a command sequence that is generated using the communication parameters.

4. The method of claim 1, wherein said communicating with the domain bot comprises translating the knowledge query into JavaScript Object Notation (JSON) data in accordance with the communication protocol.

5. The method of claim 1, further comprising:
determining an additional knowledge query based on analysis of the chat text, the user state, and the knowledge query, for accessing data at the knowledge system;
determining, based on the knowledge query, another domain bot and associated additional communication protocol, from the plurality of domain bots; and
communicating the additional knowledge query using the additional communication protocol to the another domain bot to obtain an additional reply, wherein the response text is further generated based on the additional reply.

6. The method of claim 1, wherein generating the knowledge query comprises:
determining a context of the chat text based on the user state; and
generating elements for the knowledge query based on the context.

7. The method of claim 1, further comprising:
determining, based on the security level and the user query, a routing path that indicates a data or service source for the domain bot, wherein said communicating the knowledge query is performed using the routing path.

8. The method of claim 1, further comprising:
onboarding the domain bot into the knowledge system to provide access for the integration bot, wherein said onboarding comprises:
the determining the communication protocol associated with the domain bot;
the determining the security level associated with the domain bot; and determining a source destination for the domain bot, the source destination indicating a source of information for the domain bot.

9. A system comprising:

a non-transitory memory storing instructions; and a processor configured to execute the instructions to cause the system to:

access, via an integration bot, a chat text provided by a chat application instance, the chat text indicating a user query to a knowledge system;

access a user state associated with the chat application instance, the user state indicating a context for the user query;

generate, based on the user state and analysis of the chat text, a knowledge query for accessing data at the knowledge system that comprises a plurality of domain bots;

determine, based on the knowledge query, a domain bot from the plurality of domain bots and an associated communication protocol;

determine a security level associated with the domain bot;

remove text elements from the knowledge query based on the security level of the domain bot;

communicate the knowledge query using the communication protocol to the domain bot to obtain a reply from the domain bot;

generate a response text for the chat application instance based on the reply from the domain bot and the user state, wherein the response text includes at least one text element that was removed from the knowledge query based on the security level of the domain bot; and communicate the response text to the chat application instance.

10. The system of claim 9, wherein executing the instructions further causes the system to, onboard the domain bot into the knowledge system to provide access for the integration bot, wherein said onboard comprises:

the determine the communication protocol associated with the domain bot;

the determine the security level associated with the domain bot; and determine a source destination for the domain bot, the source destination indicating a source of information for the domain bot.

11. The system of claim 9, wherein executing the instructions further causes the system to, determine, based on the user query and the security level of the chat application instance, a routing path that indicates a data or service source for the domain bot, wherein said communicating the knowledge query is performed using the routing path.

12. A non-transitory machine-readable medium having instructions stored thereon, wherein the instructions are executable to cause performance of operations comprising:

accessing, via an integration bot, a chat text provided by a chat application instance, the chat text indicating a user query to a knowledge system;

accessing, via the integration bot, a user state associated with a user of the chat application instance, the user state indicating a context for the user query;

determining, based on the user state and analysis of the chat text, a domain bot from a plurality of domain bots, wherein the domain bot has a communication protocol;

generating, via the integration bot and based on the user query, a knowledge query for the integration bot to access data at the knowledge system that comprises the plurality of domain bots;

determining, by the integration bot, a security level associated with the domain bot;

removing, by the integration bot, text elements from the knowledge query based on the security level of the domain bot;

communicating the knowledge query using the communication protocol from the integration bot to the domain bot to obtain a reply from the domain bot;

generating, by the integration bot, a response text for the chat application instance based on the reply from the domain bot and the user state, wherein the response text includes at least one text element that was removed from the knowledge query based on the security level of the domain bot; and communicating the response text to the chat application instance from the integration bot, wherein the chat application instance is on a remote device separate from the integration bot and the plurality of domain bots.

13. The non-transitory machine-readable medium of claim 12, wherein the operations further comprise:

onboarding the domain bot into the knowledge system to provide access for the integration bot, wherein said onboarding comprises:

determining the communication protocol associated with the domain bot;

the determining the security level associated with the domain bot; and determining a source destination for the domain bot, the source destination indicating a source of information for the domain bot.

14. The non-transitory machine-readable medium of claim 12, wherein the operations further comprise:

determining, based on the user query and the security level of the chat application instance, a routing path that indicates a data or service source for the domain bot wherein said communicating the knowledge query is performed using the routing path.

15. The method of claim 1, wherein each of the plurality of domain bots provides a different function.

16. The method of claim 1, wherein the user state includes a user location.

17. The system of claim 9, wherein the user state includes an embedded web page indicator to indicate a web page from which the context is indicated for the user query.

18. The system of claim 9, wherein each of the plurality of domain bots provides a different function.

19. The non-transitory machine-readable medium of claim 12, wherein the operations further comprise storing the removed text elements from the knowledge query in the user state.

20. The non-transitory machine-readable medium of claim 12, wherein the user state includes an embedded web page indicator to indicate a web page from which the context is indicated for the user query.

* * * * *

UNITED STATES PATENT AND TRADEMARK OFFICE
CERTIFICATE OF CORRECTION

PATENT NO. : 10,771,407 B2
APPLICATION NO. : 15/859166
DATED : September 8, 2020
INVENTOR(S) : Amir Youssefi Page 1 of 1

It is certified that error appears in the above-identified patent and that said Letters Patent is hereby corrected as shown below:

In the Specification

In the Detailed Description:

In Column 3, Line 29, change "loots" to "bots"

Signed and Sealed this
Twentieth Day of October, 2020

Andrei Iancu
*Director of the United States Patent and Trademark Office*